Sept. 22, 1936. R. H. WHISLER ET AL 2,054,872
METHOD OF MAKING CLUTCH DISKS
Filed April 12, 1934 3 Sheets-Sheet 1
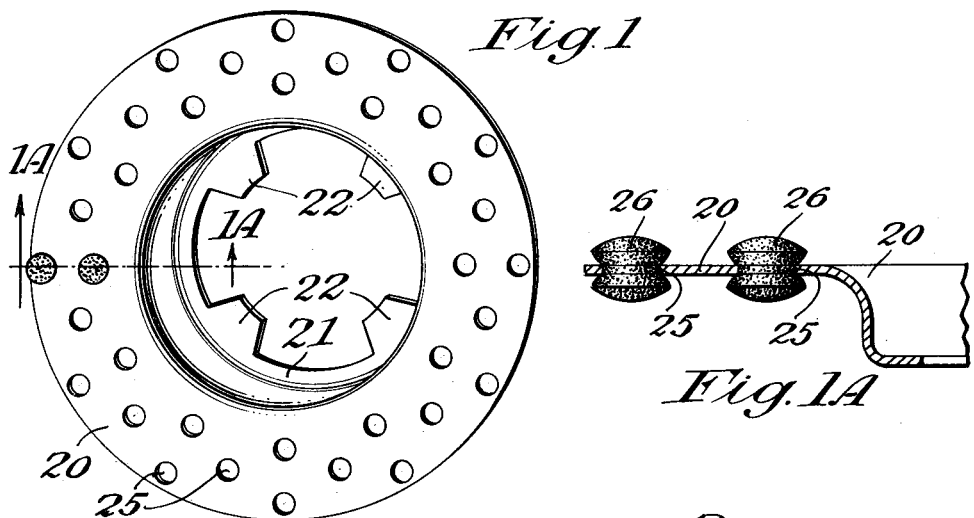
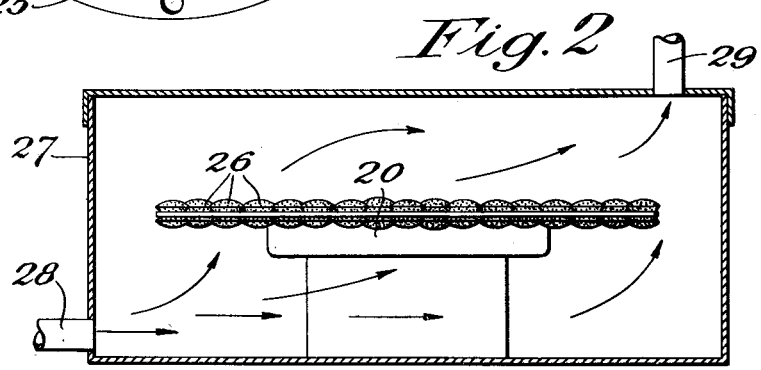
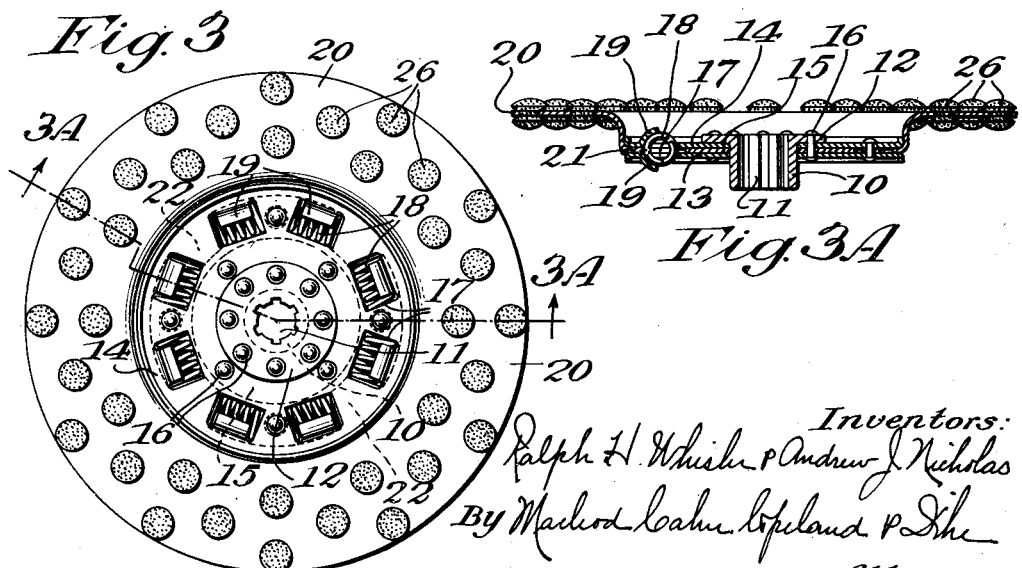
Inventors:
Ralph H. Whisler & Andrew J. Nicholas
By Macleod, Calver, Copeland & Dike
Attorneys.

Sept. 22, 1936.    R. H. WHISLER ET AL    2,054,872
METHOD OF MAKING CLUTCH DISKS
Filed April 12, 1934    3 Sheets-Sheet 2
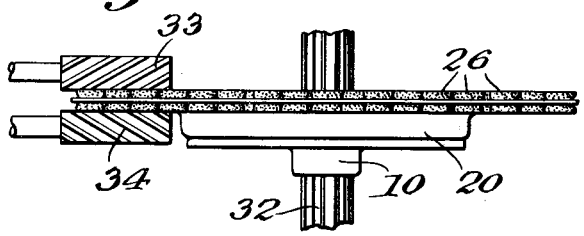
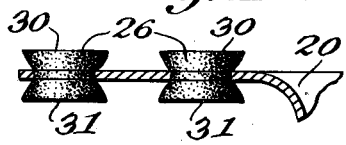
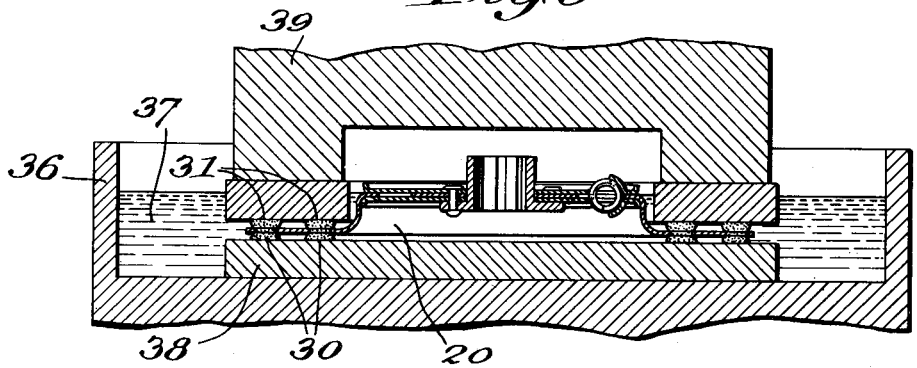
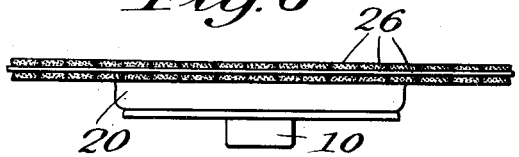
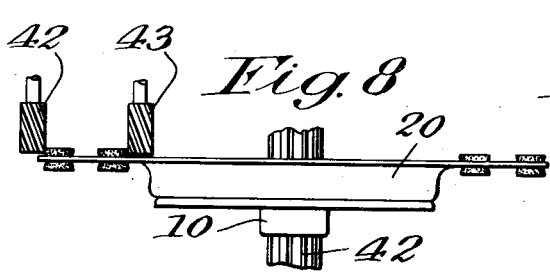
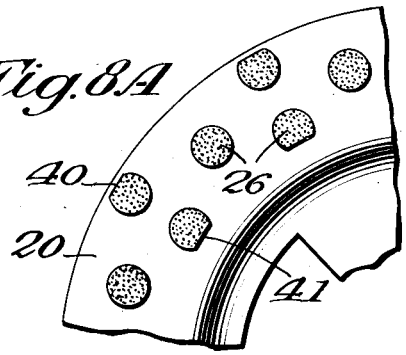
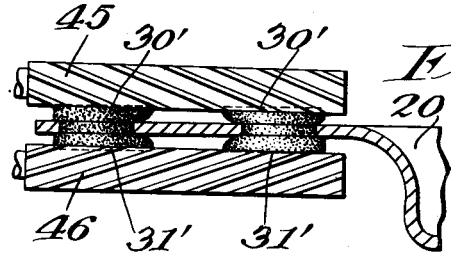
Inventors:
Ralph H. Whisler and Andrew J. Nicholas
By Macleod Calvin Copeland & Dike
Attorneys Patented Sept. 22, 1936

2,054,872

UNITED STATES PATENT OFFICE 2,054,872

METHOD OF MAKING CLUTCH DISKS

Ralph H. Whisler, Halfway, and Andrew J. Nicholas, Detroit, Mich., assignors to Hudson Motor Car Company, Detroit, Mich., a corporation of Michigan Application April 12, 1934, Serial No. 720,228

16 Claims. (Cl. 192—107)

This invention relates to friction clutches of the general type commonly used in motor vehicles for connecting the engine crank shaft in driving relation with a driven shaft which is operatively connected through the transmission with the propeller shaft of the vehicle. Such clutches comprise, in general, a drive disk mounted upon a splined portion of the driven shaft and interposed between the engine flywheel and a pressure plate. To effect the driving connection between the flywheel, pressure plate and drive disk, it is common practice to provide the drive disk with a plurality of friction inserts, such as cork, which are fixed in openings in the disk so as to project from opposite faces of the disk. Normally, the pressure plate is held against the friction inserts by strong springs to maintain the friction inserts in engagement with the flywheel to effect a driving connection between the engine and propeller shaft.

While clutches of this general type have been employed for many years, a variation in clearance between the drive disk, flywheel and pressure plate develops during about the first 2000 miles of travel of the vehicle, which, heretofore, has been impossible to avoid. Furthermore, the edges of the friction inserts in the drive disk tended to chip off and reduce the area of frictional contact.

It is an object of the present invention to provide a method of making a clutch which will avoid these difficulties.

Another object of the invention is the provision of a method of making a clutch which will render the clutch smoother acting.

The invention will be more clearly understood from the following description in conjunction with the accompanying drawings: in which, Fig. 1 is a perspective view of one part of a drive disk;

Fig. 1A is a sectional view taken upon the line IA—IA of Fig. 1;

Fig. 2 is a sectional elevational view of an apparatus for performing one step in the manufacture of the drive disk;

Fig. 3 is a front elevational view of the drive disk with the parts assembled;

Fig. 3A is a sectional view taken upon the line 3A—3A of Fig. 3;

Fig. 4 is a diagrammatic elevational view of a machine for performing another step in the manufacture of the drive disk;

Fig. 4A is a sectional view similar to that of Fig. 1A, showing the part after performing the step performed in the machine shown in Fig. 4;

Fig. 5 is a sectional elevational view of an apparatus for performing one of the steps in the manufacture of a driving disk;

Fig. 6 is an elevational view of the drive disk after being treated in the apparatus shown in Fig. 5;

Fig. 7 is a view similar to Fig. 4A illustrating the part after treatment in the apparatus shown in Fig. 5;

Fig. 8 is a diagrammatic elevational view of a machine for performing another step in the manufacture of the drive disk;

Fig. 8A is a fragmentary elevational view of the drive disk showing the completion of the operation performed by the machine shown in Fig. 7;

Fig. 9 is a diagrammatic elevational view of a machine for performing the final step in the manufacture of the drive disk.

Figure 10:
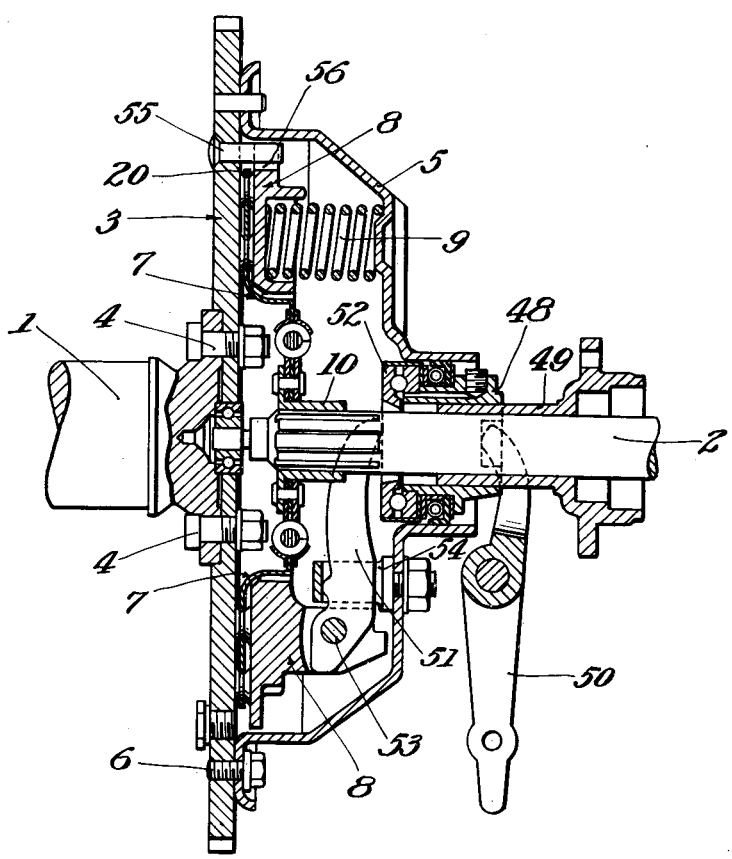
Fig. 10 is a sectional elevational view of a clutch embodying the invention.

Before explaining in detail the present invention it is to be understood that the invention is not limited in its application to the details described, since the invention is capable of being practiced or carried out in various ways. Also it is to be understood that the phaseology or terminology employed herein is for the purpose of description and not of limitation, and it is not intended to limit the invention claimed herein beyond the requirements of the prior art.

In Fig. 10 of the accompanying drawings a clutch assembly embodying the invention is illustrated for connecting the engine crank shaft 1 with a driven shaft 2 which may be operatively connected through a suitable transmission with the propeller shaft of the vehicle. A flywheel 3 is secured to the crank shaft by bolts 4. A cup shaped plate or housing 5 surrounding the driven shaft 2 is secured to the flywheel by bolts 6. A drive disk 7 is interposed between the housing 5 and the flywheel 3 adjacent the latter and is carried by a hollow hub 10 having grooves 11 on its inner surface to receive the splined end of the driven shaft 2. Interposed between the drive disk 7 and the housing 5 is a pressure plate 8 normally actuated to hold the drive disk 7 against the flywheel by a plurality of springs 9 interposed between the plate 8 and the housing 5. The pressure plate 8 is guided and positioned by a plurality of pins 55 fixed in the flywheel and projecting into slots 56 formed in the periphery of the plate 8. The pressure plate is moved out of engagement with the drive disk against the action of the springs 9 by any conventional operating mechanism which, as illustrated, may include a sleeve 48 slidably mounted upon a bearing 49 surrounding the shaft 2. The sleeve 48 is adapted to be moved to the left as viewed in Fig. 10 by a manually operated lever 50. One end of a lever 51 engages a bearing assembly 52 carried by the sleeve 48 and its other end is pivotally mounted upon a pin 53 carried by the pressure plate 8. The lever 51 is fulcrumed at an intermediate point upon a bearing 54 fixed to the housing 5. The drive disk 7 comprises a hollow hub 10 having a radially extending flange 12 and slots 11 in its inner surface adapted to receive a spline shaft. A pair of plates or disks 13 and 14 are separated by a filler plate 15 and are secured together and to the flange 12 by rivets 16. The plates 13 and 14 are provided with a plurality of circumferentially spaced substantially rectangular openings 17 each adapted to receive a spring 18. The outer edge of each of the openings 17 in the plates 13 and 14 is provided with an outwardly turned projection 19 to form a housing for the spring 18. An outer annular disk 20 is dished to provide an offset inwardly extending flange 21 which is interposed between the plates 13 and 14. The offset flange 21 is provided with a plurality of radially extending projections 22 spaced equidistant around its inner periphery. The projections 22 are adapted to extend between and engage adjacent ends of the springs 18. The disk 20, as illustrated, is positioned in a plane perpendicular to the axis of the assembled drive disk and is provided with a plurality of openings 25, each of which is adapted to receive a friction insert, such as a cork 26.

Substantially cylindrical corks, which have a cross sectional area greater than the size of the openings 25, are wet with water, for example, and inserted in the openings 25, as shown at 26, so as to project substantially equal distances from opposite sides of the disk 20 and over the opposite faces of the disk, as shown in Fig. 1A. Preferably, this is done before assembly of the disk 20 with the hub 10. The disk 20 in which the wet corks 26 are secured is then placed in a drying apparatus 27, such as is shown in Fig. 2, and allowed to remain for about four hours at a temperature of from about 210 to 220° F. during which time warm dry air is supplied through the inlet pipe 28 and is caused to circulate around the disk 20 and pass out the exhaust pipe 29.

The disk 20 is now assembled with the hollow hub 10. The friction inserts 26 are then trimmed to provide thereon flat faces 30 and 31 spaced about 0.375 inches apart and lying substantially in a plane perpendicular to the axis of the disk and which are spaced at predetermined desired distance from the faces of the disk 20. A suitable apparatus for this purpose is shown diagrammatically in Fig. 4 and comprises a rotatably driven spline shaft 32 adapted to receive the hub 10 so that the assembled drive disk can be rotated therewith. A pair of rotatably driven cutters 33 and 34 are provided adapted to engage the opposite ends of the inserts 26 and form the flat faces 30 and 31 thereon as the disk 20 is moved therebetween by rotation of the splined shaft 32.

The friction inserts 26 are then subjected to heavy pressure in a hot non-oxidizing liquid, such as oil, in order to compress and set the same, that is, permanently change their shape. A suitable apparatus for this purpose is shown in Fig. 5 and comprises a receptacle 36 having suitable means for heating the same (not shown) so as to maintain the oil 37 contained therein at a temperature of from about 400° F. to 425° F. The apparatus also includes a platen 38 submerged in the oil 37 in the receptacle 36 and positioned directly beneath a pressure head 39. The driving disk is placed upon the platen 38 (as shown in Fig. 5) with the flat faces 30 of the friction inserts 26 in engagement therewith and with the friction inserts 26 submerged in the oil 37. The pressure head 39 is then moved into engagement with the flat faces 31 of the inserts 26 and a heavy pressure applied thereto to compress and set the inserts so that the distance between the faces 30 and 31 is about 0.25 inch. In a drive disk having 108 cork inserts secured in openings of $\frac{7}{16}$ inch diameter, satisfactory results are obtained using a total pressure of about 1800 pounds. The driving disk is permitted to remain in the hot oil under this heavy pressure for about one hour after which it is removed from the oil while hot and allowed to cool in the atmosphere at normal temperatures as shown in Fig. 6. By comparison of Fig. 4A and Fig. 7, which are similar views illustrating the shape of the friction inserts before and after treatment in hot oil under heavy pressure, it will be noted that this treatment has substantially eliminated the sharp edges of the faces 30 and 31 and has set and hardened the friction inserts. The hardness of the faces 30 and 31 as indicated by a durometer test is between 65 and 75. Consequently, the difficulties caused by the sharp edges chipping off is avoided.

The outer edges and inner edges of the outer and inner friction inserts may be trimmed, if necessary, as shown at 40 and 41 respectively in Fig. 8A to the desired outside and inside diameters. The amount trimmed, as shown in Fig. 8A is exaggerated for purposes of illustration. A suitable apparatus for this purpose is shown in Fig. 8 and comprises a rotatably driven splined shaft 42 adapted to receive the hub 10 so that the driving disk can be rotated therewith. The apparatus also comprises rotatably driven cutters 42 and 43 adapted to trim off the inserts as shown at 40 and 41 in Fig. 8A as the disk 20 is moved therebetween by rotation of the splined shaft 42.

The friction inserts 26 are then subjected to a final trimming operation to reduce their overall thickness to that desired and to position the final trimmed substantially flat faces 30' and 31' as desired. These faces 30' and 31' are formed, preferably, at an inclination such that the intersections thereof with a plane passing through the axis of the disk are inclined to a plane perpendicular to the axis of the disk at an angle of about 1°. A suitable apparatus for this purpose is shown diagrammatically in Fig. 9 and may comprise a rotatably driven splined shaft (not shown), similar to that shown in Figs. 4 and 8, adapted to receive the hub 10 of the drive disk to the disk 20 between rotatably driven cutters 45 and 46, the axes of which are inclined to a plane perpendicular to the axis of the drive disk.

When the friction inserts of the drive disk are treated in accordance with the method of the invention they are compressed, hardened and set to such an extent as to overcome the difficulties heretofore experienced due to variation in clearances between the drive disk, flywheel and pressure plate. Furthermore, the edges of the friction inserts are thicker and, inasmuch as they are hardened and set, there is no danger of their chipping off and reducing the area of frictional contact between the drive disk, the flywheel and the pressure plate. By inclining the opposite faces of the friction inserts a smoother acting clutch is obtained due to the fact that the frictional engagement between the drive disk and the flywheel and pressure plate is effected more or less gradually in a radial direction. The outer friction inserts of the drive disk first engage one of these members and the inner friction inserts first engage the other member, full frictional engagement being effected graually in radial inward and outward directions respectively utilizing the resilience permitted by the curved portion between the disk 20 and its offset flange 21.

What we claim is:

1. In a method of making a clutch having a pair of pressure elements and an interposed driving element, one of each of the adjacent cooperating surfaces of said elements being a friction surface, the step which comprises subjecting the friction surfaces to heavy pressure while immersed in a hot non-oxidizing liquid.

2. In a method of making a clutch having a pair of pressure elements and an interposed driving element, one of each of the adjacent cooperating surfaces of said elements being a friction surface, the steps which comprise subjecting the friction surfaces to heavy pressure while immersed in a hot non-oxidizing liquid, trimming said friction surfaces so that the intersection thereof with a plane through the axis of the clutch is positioned in desired relation with respect to a plane perpendicular to said axis.

3. In a method of making a clutch having a pair of pressure elements and an interposed driving element, one of each of the adjacent cooperating surfaces of said elements being a friction surface, the steps which comprise trimming said friction surfaces to render them substantially flat, subjecting the friction surfaces to heavy pressure while immersed in a hot non-oxidizing liquid, and thereafter trimming said friction surfaces so that the intersection thereof with a plane through the axis of the clutch is positioned in desired relation with respect to a plane perpendicular to said axis.

4. In a method of making a clutch having a pair of pressure elements and an interposed driving element, one of each of the adjacent cooperating surfaces of said elements being a friction surface, the steps which comprise subjecting the friction surfaces to heavy pressure while immersed in a hot non-oxidizing liquid, and trimming said friction surfaces so that the intersection thereof with a plane through the axis of the clutch is inclined to a plane perpendicular to said axis.

5. In a method of making a clutch having a pair of pressure elements and an interposed driving element, one of each of the adjacent cooperating surfaces of said elements being a friction surface, the step which comprises subjecting the friction surfaces to heavy pressure for about one hour while immersed in a hot non-oxidizing liquid at a temperature from about 400° F. to about 425° F.

6. In a method of making a clutch having a pair of pressure elements and an interposed driving element, one of each of the adjacent cooperating surfaces of said elements being a friction surface, the steps which comprise subjecting the friction surfaces to heavy pressure for about one hour while immersed in a hot non-oxidizing liquid at a temperature from about 400° F. to about 425° F., and trimming said friction surfaces so that the intersection thereof with a plane through the axis of the clutch is positioned in desired relation with respect to a plane perpendicular to said axis.

7. In a method of making a clutch having a pair of pressure elements and an interposed driving element, one of each of the adjacent cooperating surfaces of said elements being a friction surface, the steps which comprise trimming said friction surfaces to render them substantially flat, subjecting the friction surfaces to heavy pressure for about one hour while immersed in a hot non-oxidizing liquid at a temperature from about 400° F. to about 425° F., and thereafter trimming said friction surfaces so that the intersection thereof with a plane through the axis of the clutch is positioned in desired relation with respect to a plane perpendicular to said axis.

8. In a method of making a clutch having a pair of pressure elements and an interposed driving element, one of each of the adjacent cooperating surfaces of said elements being a friction surface, the steps which comprise subjecting the friction surfaces to heavy pressure for about one hour while immersed in a hot non-oxidizing liquid at a temperature from about 400° F. to about 425° F., and trimming said friction surfaces so that the intersection thereof with a plane through the axis of the clutch is inclined to a plane perpendicular to said axis.

9. In a method of making a clutch drive disk having a plurality of friction inserts fixed in openings in the disk, the step which comprises subjecting the inserts to heavy pressure while immersed in a hot non-oxidizing liquid.

10. In a method of making a clutch drive disk having a plurality of friction inserts fixed in openings in the disk, the steps which comprise subjecting the inserts to heavy pressure while immersed in a hot non-oxidizing liquid, and trimming the inserts to provide faces thereon positioned so that the intersection thereof with a plane through the axis of the disk is positioned in desired relation with respect to a plane perpendicular to said axis.

11. In a method of making a clutch drive disk having a plurality of friction inserts fixed in openings in the disk, the steps which comprise subjecting the inserts to heavy pressure while immersed in a hot non-oxidizing liquid, and trimming the inserts to provide faces thereon so that the intersection thereof with a plane through the axis of the disk is inclined to a plane perpendicular to said axis.

12. In a method of making a clutch drive disk having a plurality of friction inserts fixed in openings in the disk, the steps which comprise trimming the inserts to provide substantially flat faces thereon, subjecting the inserts to heavy pressure while immersed in a hot non-oxidizing liquid, and thereafter trimming the inserts to provide faces thereon so that the intersection thereof with a plane through the axis of the disk is inclined to a plane perpendicular to said axis.

13. In a method of making a clutch drive disk having a plurality of friction inserts fixed in openings in the disk, the step which comprises subjecting the inserts to a heavy pressure for about one hour while immersed in a non-oxidizing liquid at a temperature from about 400° F. to about 425° F.

14. In a method of making a clutch drive disk having a plurality of friction inserts fixed in openings in the disk, the steps which comprise subjecting the inserts to a heavy pressure for about one hour while immersed in a non-oxidizing liquid at a temperature from about 400° F. to about 425° F., and trimming the inserts to provide faces thereon positioned so that the intersection thereof with a plane through the axis of the disk is positioned in desired relation with respect to a plane perpendicular to said axis.

15. In a method of making a clutch drive disk having a plurality of friction inserts fixed in openings in the disk, the steps which comprise subjecting the inserts to a heavy pressure for about one hour while immersed in a non-oxidizing liquid at a temperature from about 400° F. to about 425° F., and trimming the inserts to provide flat faces thereon so that the intersection thereof with a plane through the axis of the disk is inclined to a plane perpendicular to said axis.

16. In a method of making a clutch drive disk having a plurality of friction inserts fixed in openings in the disk, the steps which comprise trimming the inserts to provide substantially flat faces thereon, subjecting the inserts to a heavy pressure for about one hour while immersed in a non-oxidizing liquid at a temperature from about 400° F. to about 425° F. and thereafter trimming the inserts to provide faces thereon so that the intersection thereof with a plane through the axis of the disk is inclined to a plane perpendicular to said axis.

RALPH H. WHISLER.
ANDREW J. NICHOLAS.